Oct. 3, 1967 L. V. CHABALA ET AL 3,345,473

HIGH VOLTAGE GAS TYPE CIRCUIT INTERRUPTERS IN TANDEM WITH A CENTER BREAK DISCONNECTING SWITCH

Filed Dec. 20, 1965 10 Sheets-Sheet 3

Oct. 3, 1967 L. V. CHABALA ET AL 3,345,473

HIGH VOLTAGE GAS TYPE CIRCUIT INTERRUPTERS IN TANDEM WITH A CENTER BREAK DISCONNECTING SWITCH

Filed Dec. 20, 1965 10 Sheets-Sheet 9

Oct. 3, 1967 L. V. CHABALA ET AL 3,345,473

HIGH VOLTAGE GAS TYPE CIRCUIT INTERRUPTERS IN TANDEM WITH A CENTER BREAK DISCONNECTING SWITCH

Filed Dec. 20, 1965

10 Sheets-Sheet 10

3,345,473

HIGH VOLTAGE GAS TYPE CIRCUIT INTERRUPTERS IN TANDEM WITH A CENTER BREAK DISCONNECTING SWITCH

Leonard V. Chabala, Maywood, and Edward J. Rogers, Chicago, Ill., assignors to S & C Electric Company, Chicago, Ill., a corporation of Delaware Filed Dec. 20, 1965, Ser. No. 514,777
22 Claims. (Cl. 200—48)

ABSTRACT OF THE DISCLOSURE

A single mechanism common to two serially connected separable contact circuit interrupters opens and closes the contacts simultaneously in conjunction with the opening and closing of a series connected center break disconnecting switch.

Figure 1:
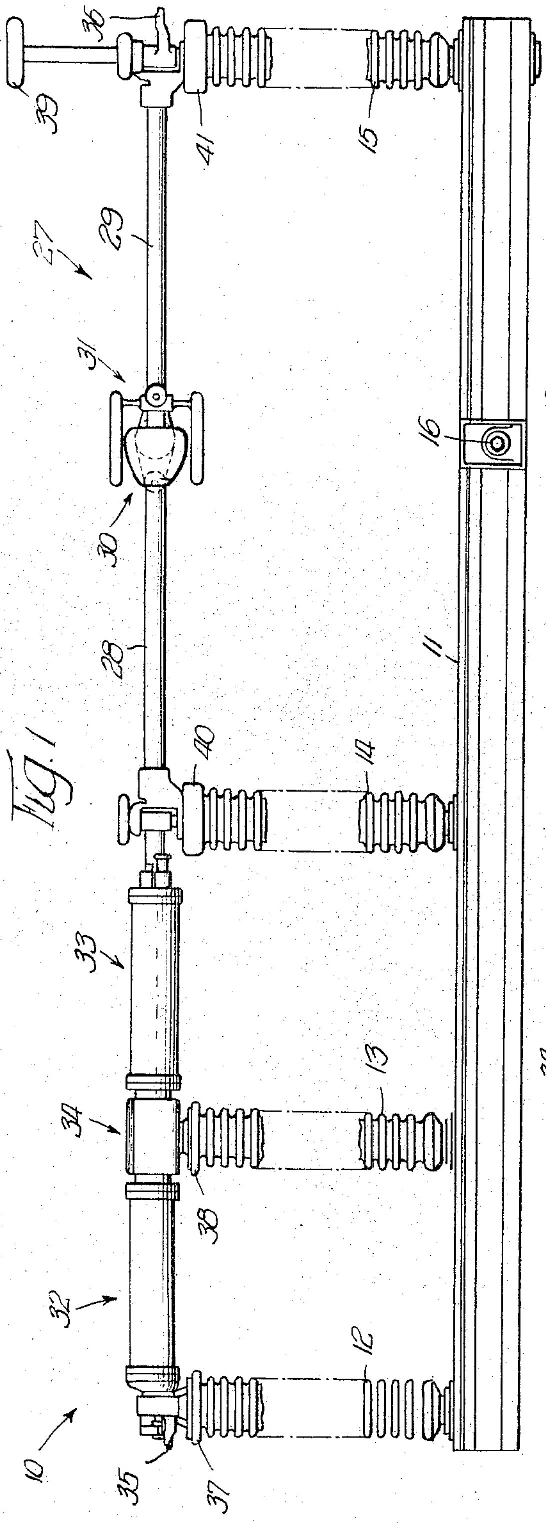

This invention relates, generally, to circuit interrupters for use with circuits operating at 500 kv., 60 cycle alternating current in which the load current flow normally does not exceed 2,000 amperes and in which the fault current may be of the order of 44,000 amperes symmetrical. It can be employed on circuits operating at higher or lower voltages, at different frequencies, and for different current ranges.

It constitutes an improvement over the inventions disclosed in Gussow et al. U.S. Patent 3,030,481 issued Apr. 17, 1962, Mikos et al. U.S. Patent 3,163,736, issued Dec. 29, 1964, Mikos U.S. Patent 3,194,928, issued July 13, 1965, and Bernatt U.S. Patent 3,244,826, issued Apr. 5, 1966.

Among the objects of this invention are: To provide for synchronizing the operation of series connected high voltage circuit interrupters such that the contacts thereof can be opened substantially simultaneously or within less than one quarter of a half cycle of 60 cycle alternating current; to employ for this purpose a walking beam to the distal ends of which contact operating members are mechanically connected; to bias the walking beam to open the contacts and to provide a latch cooperating with the walking beam to hold the contacts closed and against this biasing action; to pry open the contacts by further operation of the latch if the biasing means is incapable of initiating opening of the contacts; to provide a rotatable mechanism cam for tripping the latch, rotating the walking beam to reclose the contacts of the circuit interrupters and for winding up the spring that biases them to the open positions; to arrange for the mechanism cam to trip the latch at different operating positions of the cam; to provide for over travel of the mechanism cam after the contacts are latched in their closed positions; to provide each circuit interrupter with at least one pair of translatory separable main contacts in parallel circuit relation with a pair of translatory separable auxiliary contacts, each pair of contacts having a translatory operating member individual thereto connected respectively to the distal ends of first and second walking beams; to operatively interconnect the first and second walking beams and to rotate them by the spring, first to substantially simultaneously open the pairs of separable main contacts and next by substantially simultaneously opening the pairs of separable auxiliary contacts; to operatively interconnect the first and second walking beams by a tie spring and by mutally engageable abutment means; to provide another latch for preventing opening of the pairs of separable auxiliary contacts and to trip this latch when the first walking beam is rotated to a predetermined position; to rotatably mount the walking beams on a shaft and to secure the mechanism cam for rotation with this shaft with the spring being wound by torque applied to the shaft at one end and transmitted by the mechanism cam to the first walking beam; to secure the mechanism cam to the shaft adjacent the end where the torque is applied whereby the torque is required to be transmitted only through a relatively short length of the shaft; to rotatably mount the second walking beam on the first walking beam, thereby confining the force exerted by the tie spring to the walking beams and the bearing means therebetween; to locate symmetrically on the first and second walking beams the mutually engageable abutment means to transmit substantially equal and simultaneous acceleration forces to the distal ends of the second walking beam; to enclose each pair of parallel connected separable main and auxiliary contacts in an insulating housing filled with an arc extinguishing gas, with a conducting mechanism housing supporting one end of each insulating housing and connecting the pairs of separable main and auxiliary contacts in series circuit relation; and to connect the series connected circuit interrupters in series with a disconnecting switch and to operate the circuit interrupters and the disconnecting switch in predetermined sequence to open and close a high voltage circuit.

Figure 2:
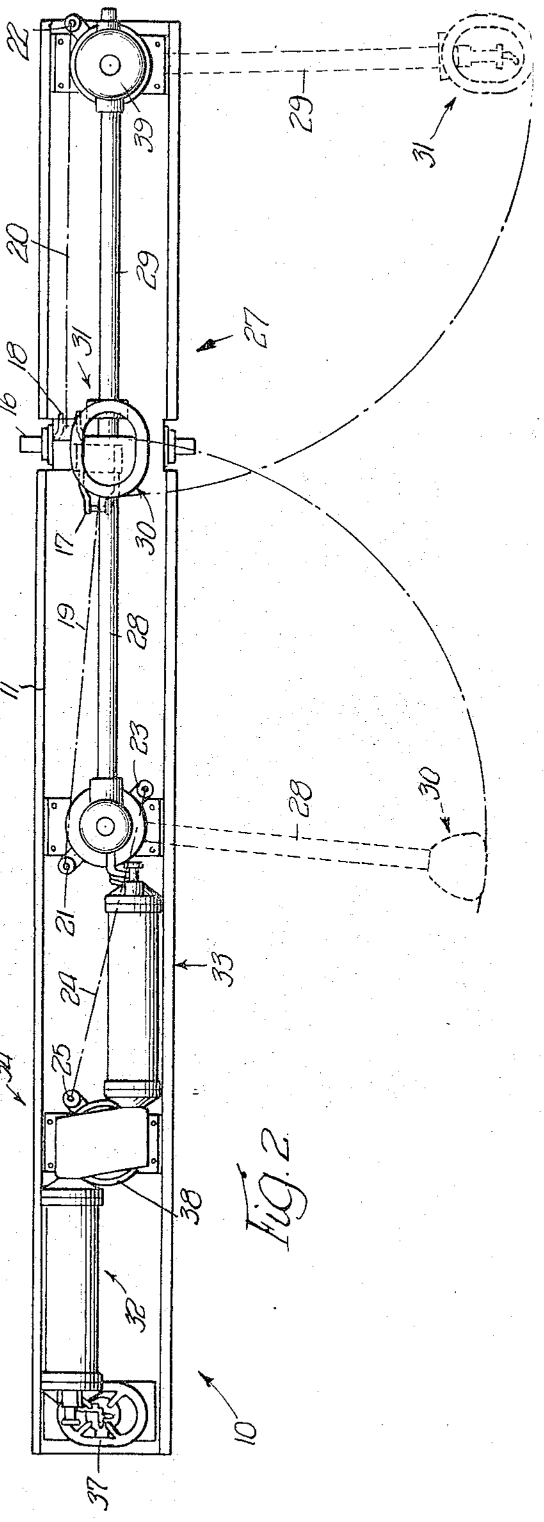
Figure 3A:
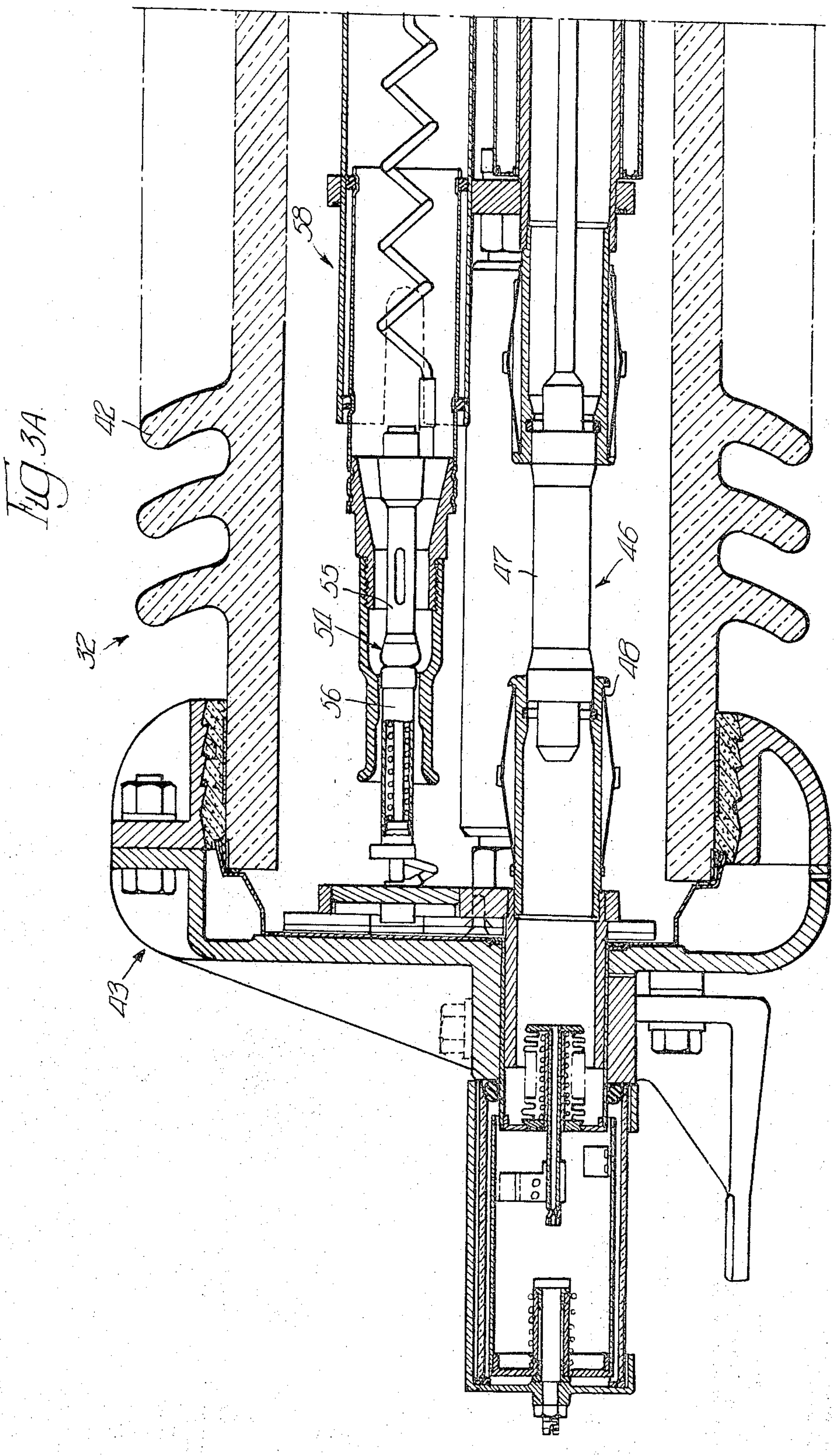
Figure 3B:
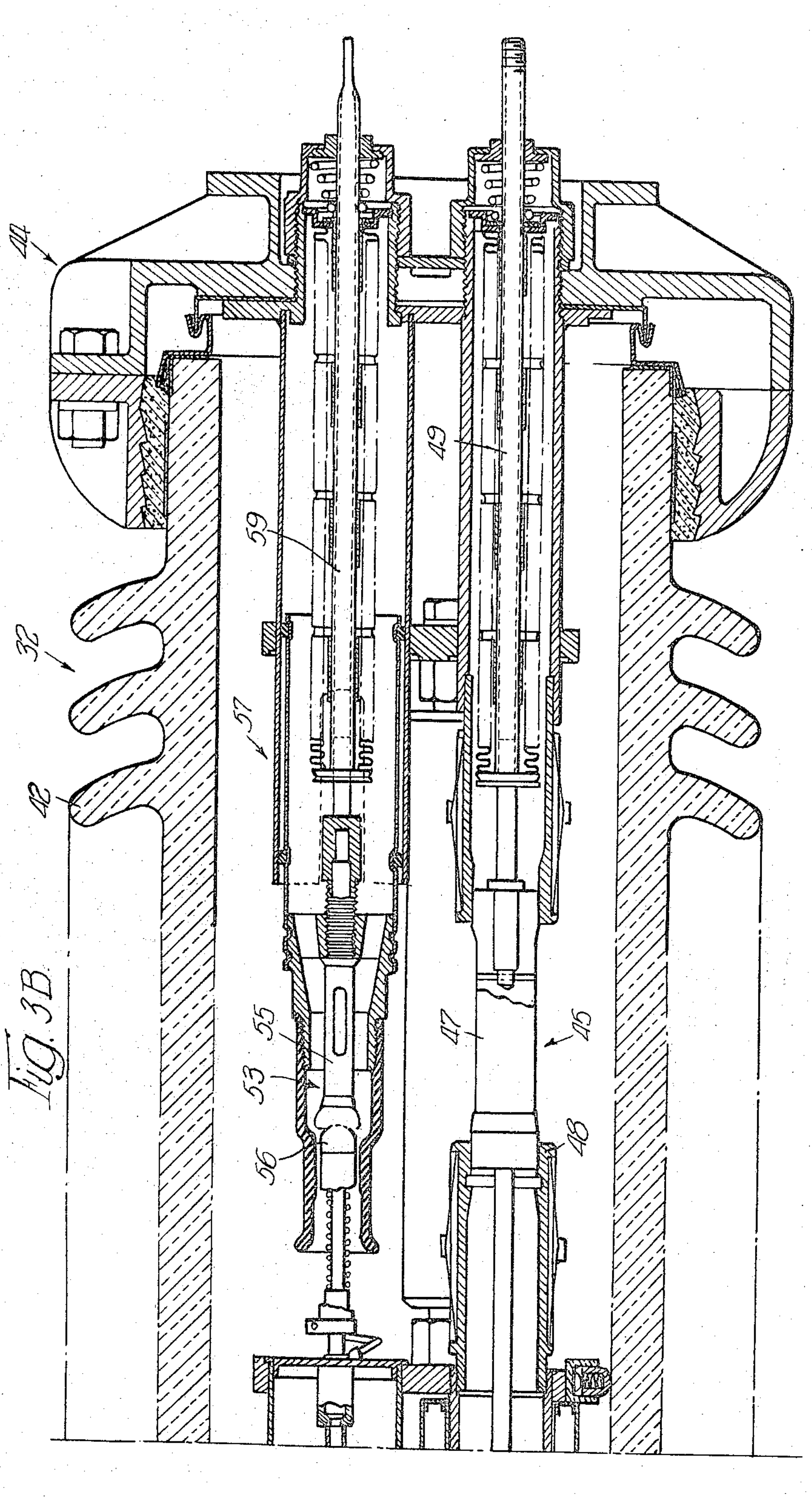
Figure 4:
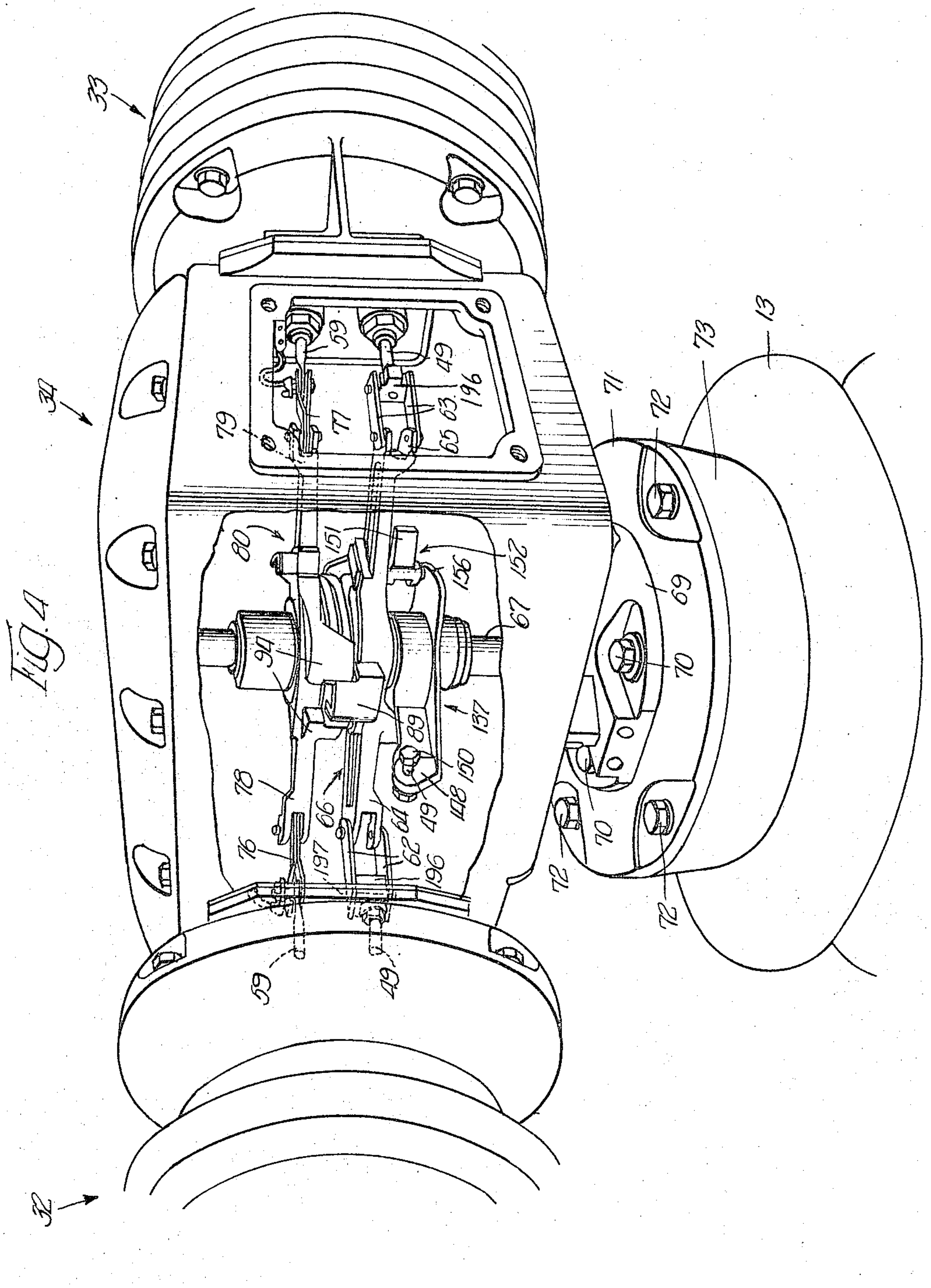
Figures 5, 6:
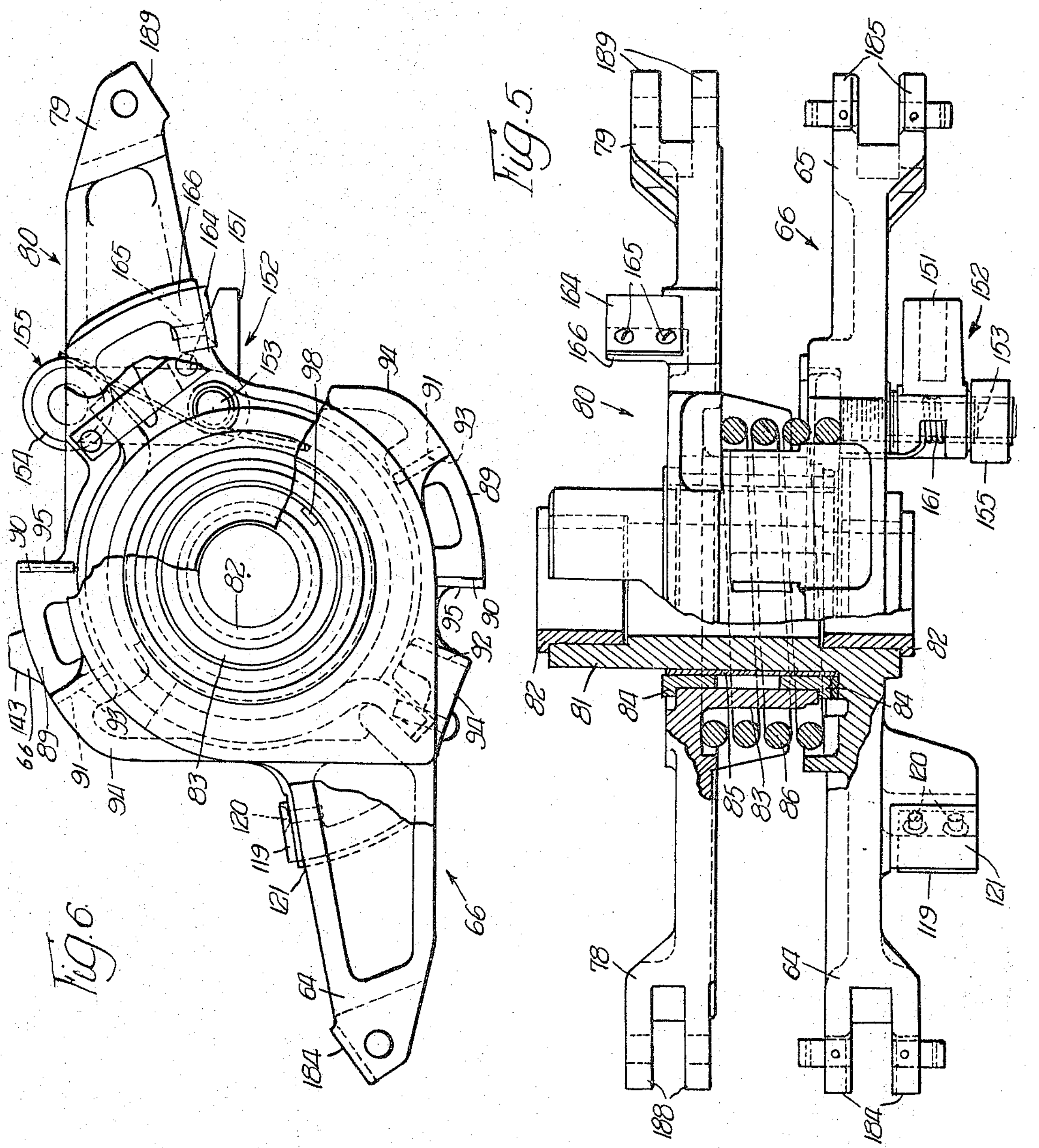
Figure 7:
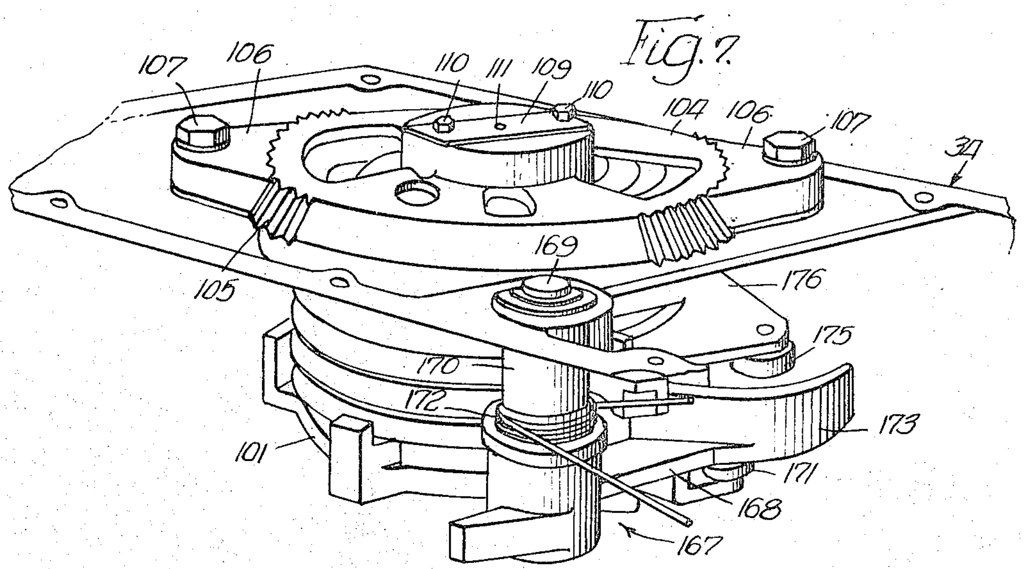
Figures 8, 9:
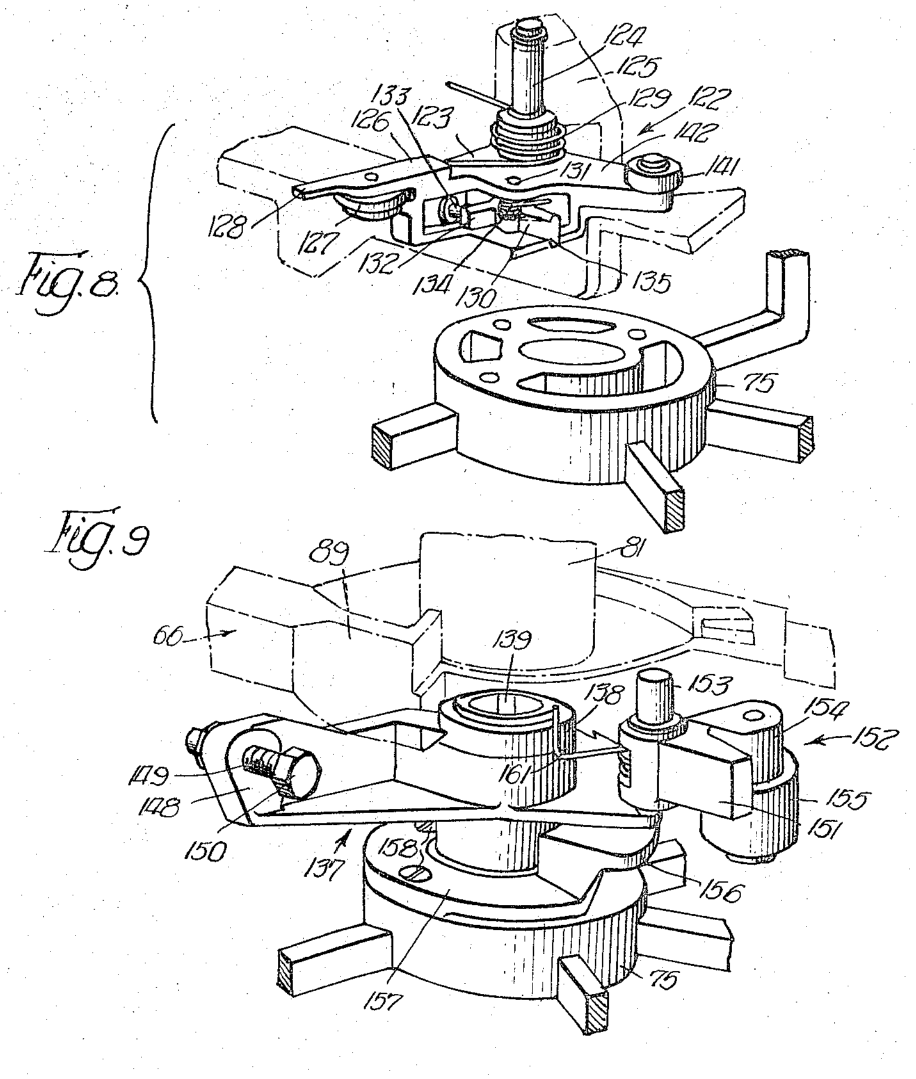
Figure 10:
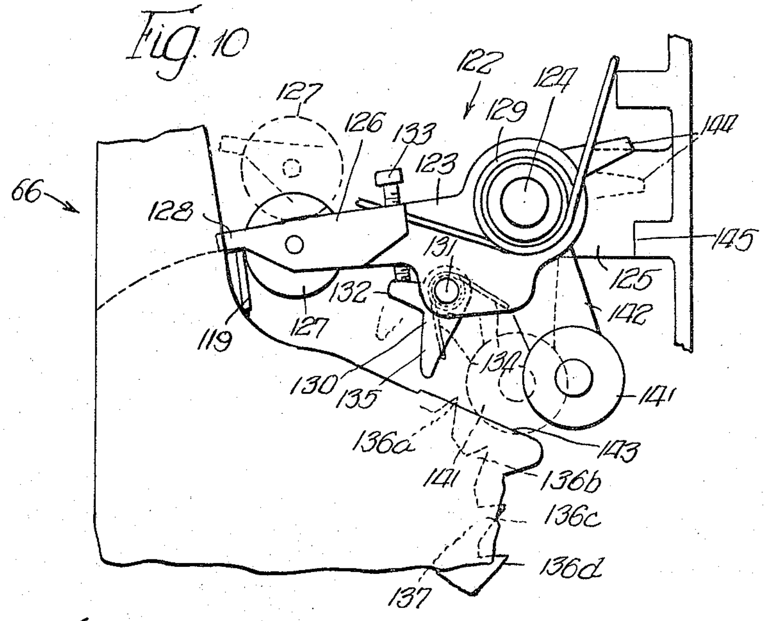
Figure 11:
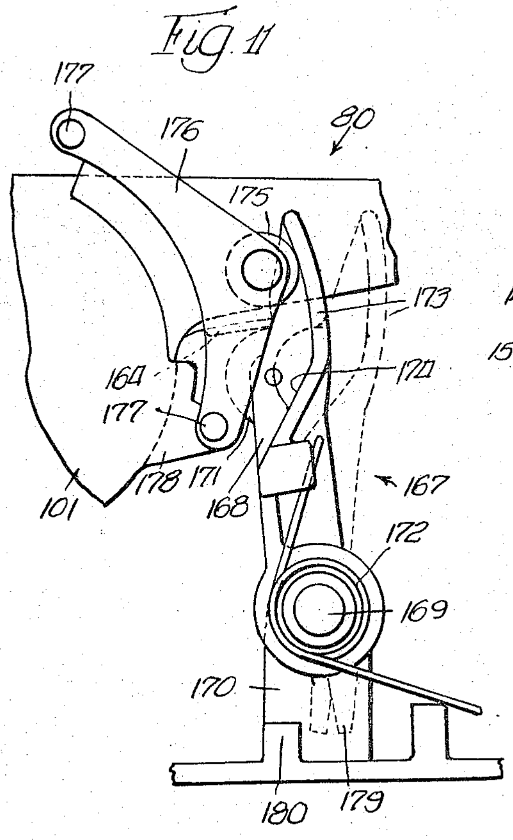
Figure 12:
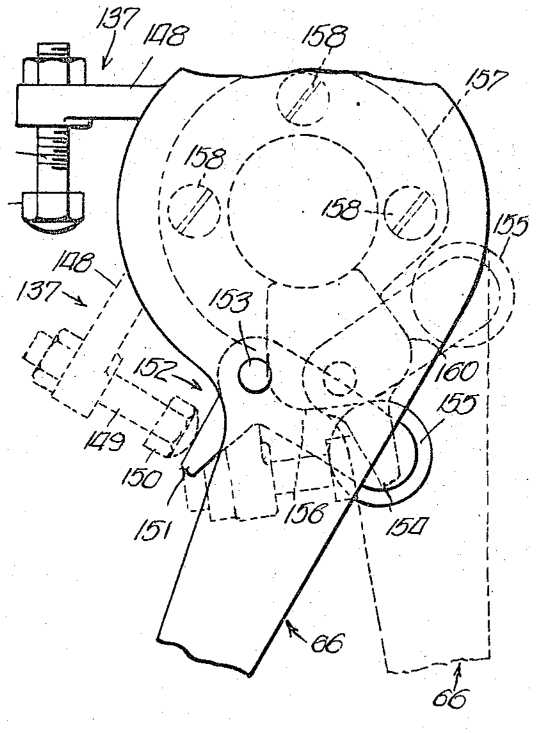
Figure 13:
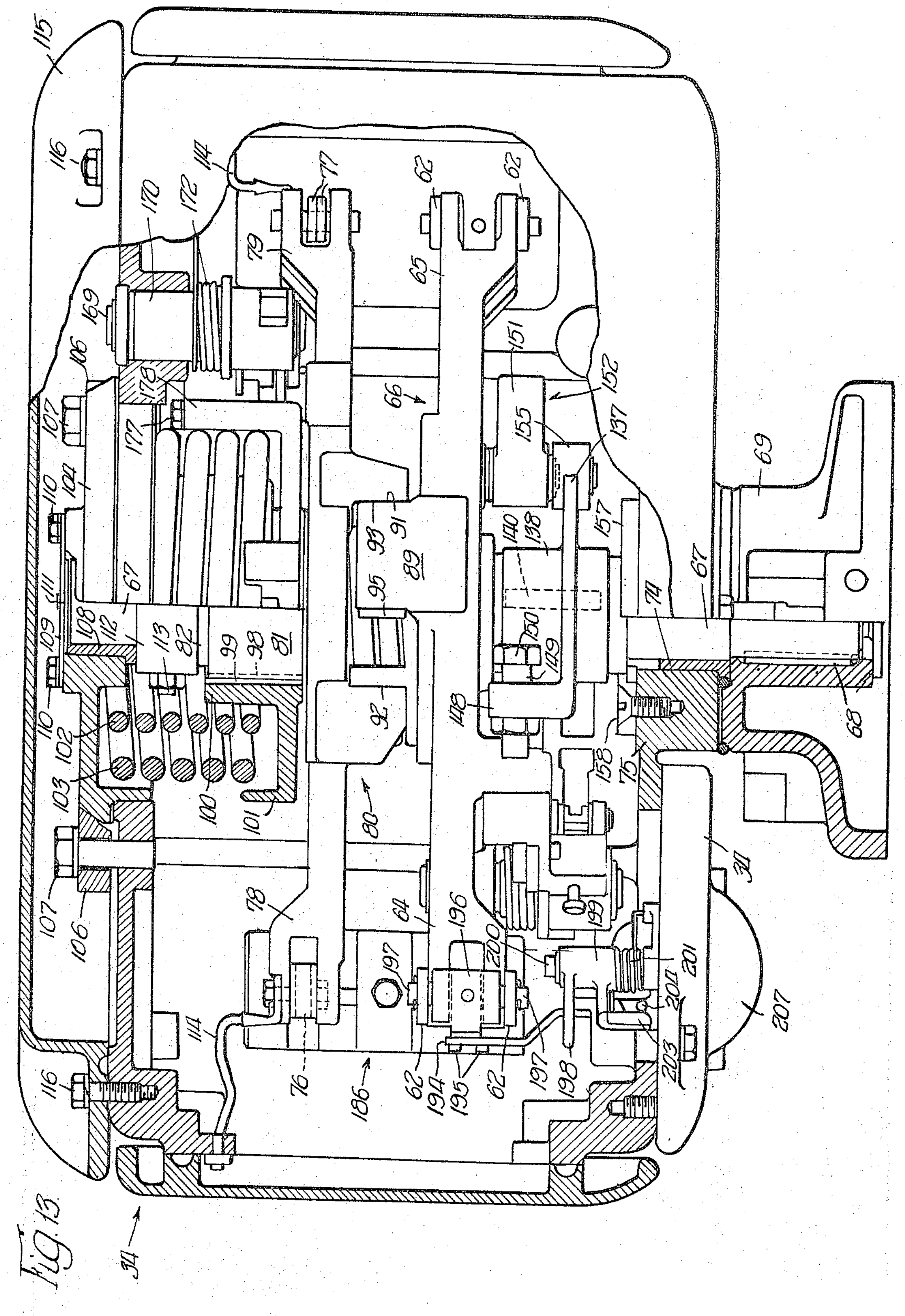
Figure 14:
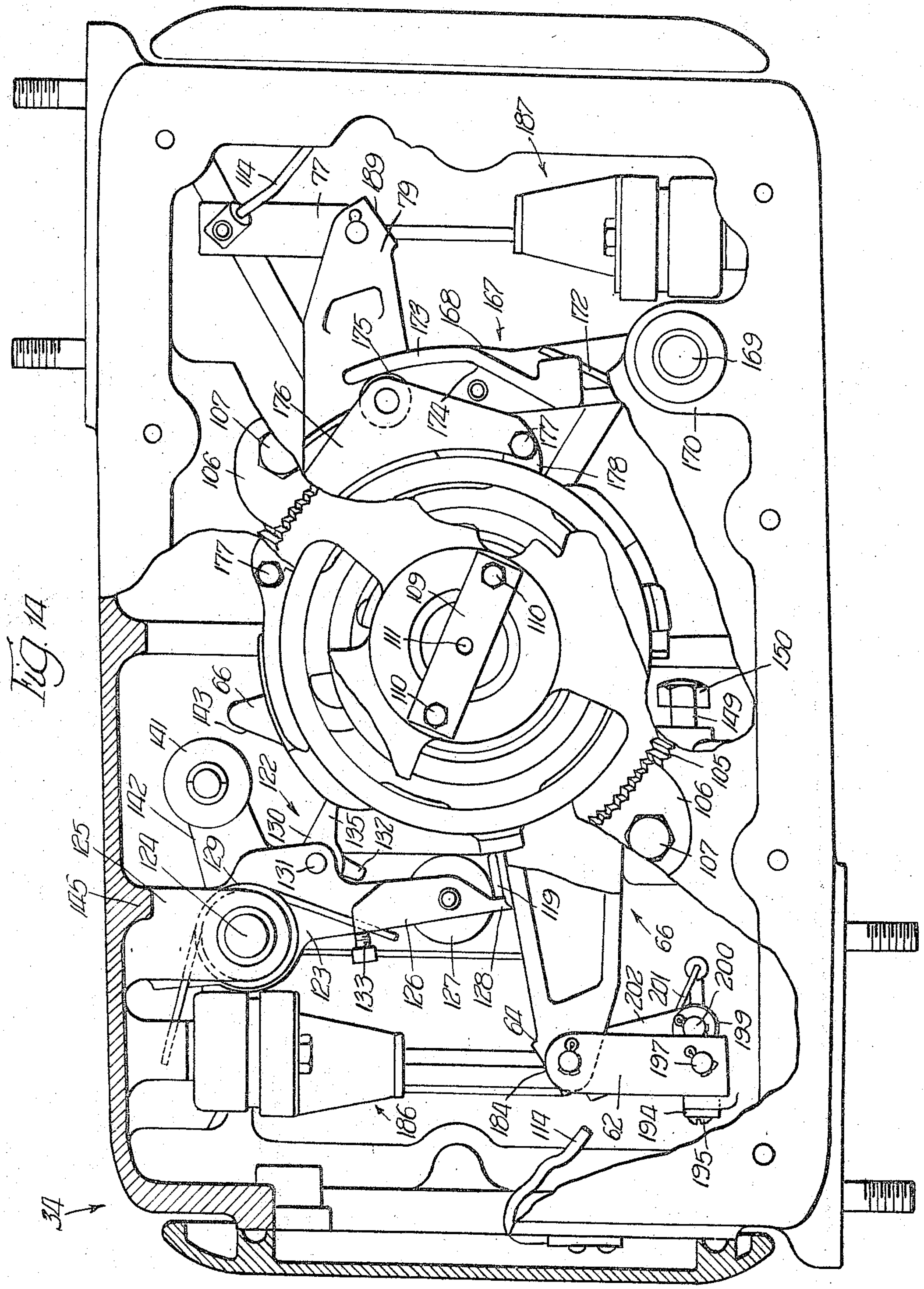
Figure 15:
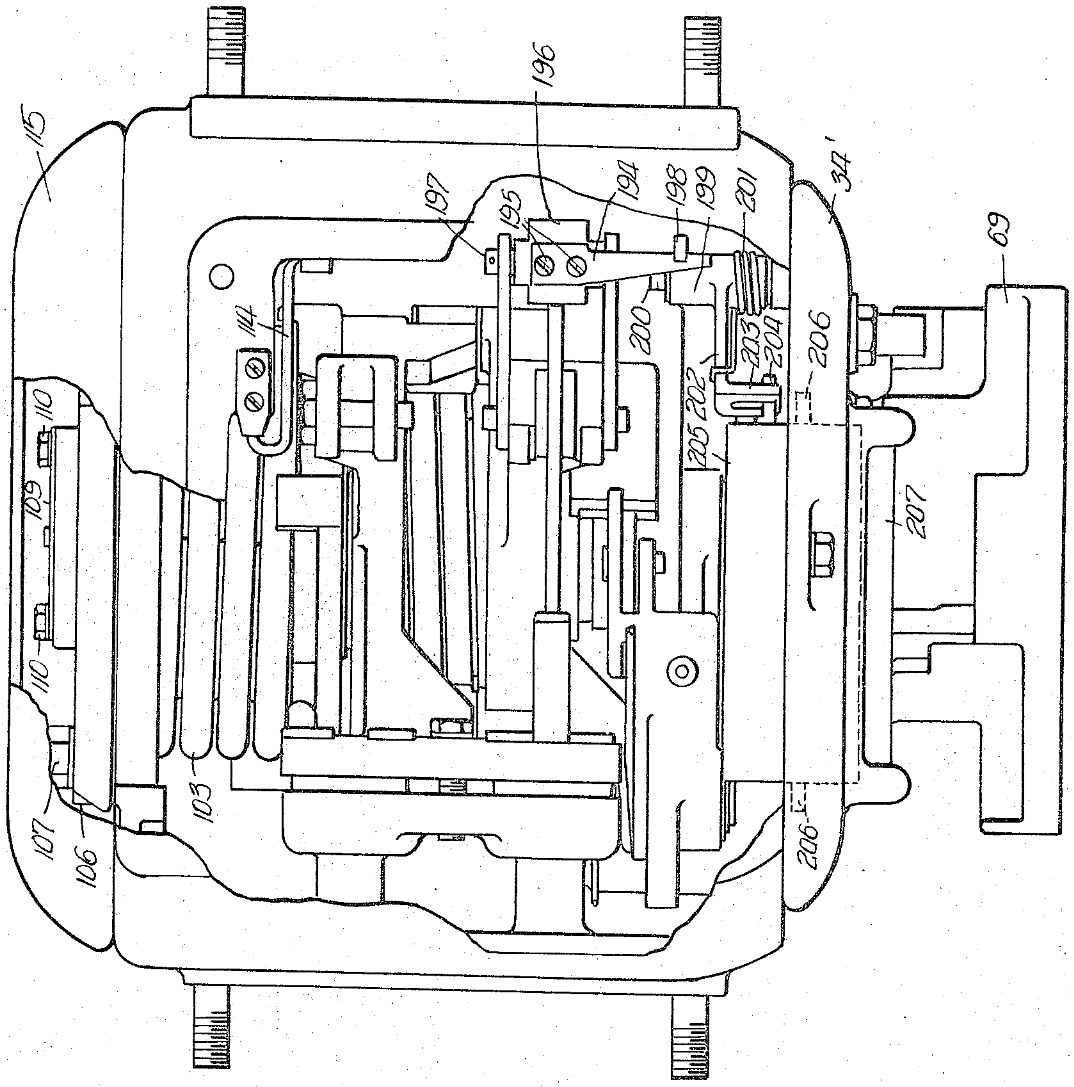

In the drawings: FIG. 1 is a view, in side elevation, of a high voltage switch construction embodying this invention. FIG. 2 is a top plan view of the switch construction shown in FIG. 1. FIGS. 3A–B, taken together in end-to-end relation, show a vertical sectional view of one of the circuit interrupters provided with series connected main and auxiliary pairs of contacts in parallel circuit relation. FIG. 4 is a perspective view and at an enlarged scale of the mechanism housing shown in FIGS. 1 and 2, including portions of the circuit interrupters mounted thereon and a portion of the supporting rotatable insulator. FIG. 5 is a view, partly in side elevation and partly in section, of the first and second walking beams that form a part of the operating mechanism. FIG. 6 is a top plan view of the walking beams shown in FIG. 5, certain parts being broken away in order to show details of construction. FIG. 7 is a perspective view of the adjustment plate, latch for the second walking beam and certain immediately associated parts. FIG. 8 is a perspective view of the latch associated with the first walking beam. FIG. 9 is a perspective view of the mechanism cam and parts immediately associated therewith. FIG. 10 is a top plan view of the latch for the first walking beam and shows a portion of this walking beam. FIG. 11 is a top plan view of the latch for the second walking beam and shows a portion of the spring retainer. FIG. 12 is a top plan view of a portion of the mechanism cam and illustrates how the over travel cam functions. FIG. 13 is a view, in side elevation, of the mechanism housing, one of the side walls being broken away and parts being shown in section to illustrate more clearly the details of construction. FIG. 14 is a top plan view of the mechanism housing shown in FIG. 13, certain parts being broken away and others being shown in section. FIG. 15 is an end view looking from left to right of FIGS. 13 and 14, a portion of the mechanism housing being broken away to show certain of the internal details of construction.

In FIGS. 1 and 2 the reference character 10 designates, generally, a switch construction embodying this invention. It is intended for operation on a 500 kv. 60 cycle alternating current system. However, it can be employed on systems operating at different voltages with suitable modifications. The switch construction 10 employs a horizontally extending switch base 11 and carries at its left end a stationary insulator stack 12. Also extending upwardly from the switch base 11 are first, second and third rotatable insulator stacks 13, 14 and 15. The mechanism for rotating the second and third insulator stacks 14 and 15 is described in detail in the above Bernatt patent. This operating mechanism includes a shaft 16 that is rotatable about a horizontal axis and from which arms 17 and 18 extend. These arms are connected by links 19 and 20 to arms 21 and 22 that are suitably connected to the second and third rotatable insulator stacks 14 and 15 for rotating them on rotation of the shaft 16. Another arm 23 extends from the base of the rotatable insulator stack 14 and is connected by a link 24 to an arm 25 that extends radially from the base of the first rotatable insulator stack 13. The arrangement preferably is such that, on rotation of the shaft 16 about its horizontal axis through 180° the second and third insulator stacks 14 and 15 are each rotated in opposite directions through 95° while the first insulator stack 13 is being rotated through 102°. The first, second and third rotatable insulator stacks 13, 14 and 15 are arranged to rotate about their vertical axes. It will be understood that these figures for the extents of rotation of the various members are stated for illustrative purposes and that other degrees of rotation can be employed.

A disconnecting switch, shown generally at 27, is mounted on the second and third rotatable insulator stacks 14 and 15. The disconnecting switch 27 includes switch blades 28 and 29 that are secured to the upper ends of the second and third insulator stacks 14 and 15 for rotation in a horizontal plane. Contacts 30 and 31 are carried by the distal ends of the switch blades 28 and 29 for contact engagement in the closed position of the disconnecting switch 27. They are arranged to be separated when the disconnecting switch 27 is operated to the open position shown by broken lines in FIG. 2.

In order to effect circuit interruption without external arcing, circuit interrupters, shown generally at 32 and 33, are employed. The circuit interrupters 32 and 33 are of identical construction and may be formed as illustrated in FIGS. 3A–B. For the details of construction of the circuit interrupter 32 or 33 reference can be had to the above identified Mikos et al. patent. One end of the circuit interrupter 32 is carried by the stationary insulator stack 12 while the other end is mounted on a mechanism housing 34 which is carried by the first rotatable insulator stack 13. The other circuit interrupter 33 is mounted at one end on the mechanism housing 34 that preferably is formed of an aluminum alloy, while its other end is mounted on the second rotatable insulator stack 14. End terminal pads 35 and 36 are provided on the stationary insulator stack 12 and on the third rotatable insulator stack 15 to permit circuit connection to the switch construction 10. It will be understood that the circuit from the end terminal pad 35 extends through the circuit interrupter 32, mechanism housing 34, circuit interrupter 33, blades 28 and 29 of the disconnecting switch 27 to the end terminal pad 36. Since the switch construction is intended to operate at a relatively high voltage, voltage grading electrodes 37 and 38 are provided at the upper ends of the insulator stacks 12 and 13 and a voltage grading electrode 39 is provided above the distal end of the third insulator stack 15. The insulator stacks 14 and 15 are provided with grading rings 40 and 41 at their upper ends.

As pointed out, the switch blades 28 and 29 are arranged to rotate in a horizontal plane between the switch closed and the switch open positions. The circuit interrupters 32 and 33 are located in this same horizontal plane. Viewed from above, the circuit interrupters 32 and 33 are located on opposite sides of the vertical plane that extends through the switch blades 27 and 28 when they are in switch closed position shown in FIG. 2. This arrangement permits the use of different lengths of circuit interrupter units 32 and 33 without requiring different end mounting fittings. It is necessary to change only the spacing between the insulator stacks 12, 13 and 14.

FIGS. 3A–B show certain of the internal details of construction of the circuit interrupter 32. It will be understood that the circuit interrupter 33 is identical in construction. The circuit interrupter 32 includes a cylindrical insulating housing 42 of porcelain which is provided with end terminals 43 and 44 hermetically sealed thereto. The end terminal 43 is connected to the end terminal pad 35 while the end terminal 44 is mounted on the mechanism housing 34 in a suitable manner. The insulating housing 42 is preferably filled with an arc extinguishing gas such as $SF_6$.

Within the gas filled insulating housing 42 there are located two pairs of translatory separable main contacts 45 and 46 that are connected in series circuit relation. Each pair of main contacts 45 and 46 includes a translatory main contact 47 and a relatively stationary main contact 48. It will be understood that the translatory main contacts 47 are interconnected for conjoint horizontal movement which is effected by a translatory main contact operating member 49 which is connected directly to the main contact 47 of the pair of main contacts 45 and extends externally of the sealed insulating housing 42 into the mechanism housing 34 for horizontal translatory movement in a manner to be described.

Connected in parallel circuit relation with the pairs of main contacts 45 and 46 are pairs of translatory separable auxiliary contacts 53 and 54 which are connected in series circuit relation. Each of the pairs of auxiliary contacts 53 and 54 includes a translatory auxiliary contact 55 and a relatively stationary auxiliary contact 56. Pump means, shown generally at 57 and 58, are associated with the pairs of auxiliary contacts 53 and 54, respectively, for the purpose of forcing the arc extinguishing gas into the space between the contacts 55 and 56 of each of the pairs of auxiliary contacts 53 and 54 when they are opened to interrupt the circuit. As described in the Mikos et al. patent, provision is made for effecting simultaneous translatory movement of the auxiliary contacts 55 of each of the pairs of auxiliary contacts 53 and 54, together with the simultaneous operation of the pump means 57 and 58. Such movement is effected by the translatory auxiliary contact operating member 59 which is connected directly to the auxiliary contact 55 of the pair of auxiliary contacts 53 and which extends externally of the gas filled insulating housing 42 into the mechanism housing 34 for operation by means to be described.

It will be observed that the main contacts 47 of each of the pairs of main contacts 45 and 46 have translatory movement in a horizontal plane which is below the horizontal plane in which the auxiliary contacts 55 of the pairs of auxiliary contacts 53 and 54 move.

While two pairs of translatory separable main contacts 45 and 46 have been illustrated along with parallel connected pairs of translatory separable auxiliary contacts 53 and 54, it will be understood that a greater or lesser number of pairs of contacts can be employed. For example, only a single pair of main contacts 45 can be employed in parallel circuit relation with a single pair of auxiliary contacts 53. Likewise, three or four pairs of separable contacts can be employed in series and parallel relation. The number of pairs of contacts employed in series is determined, in part, by the voltage of the circuit in which the switch construction 10 is connected and the circuit characteristics.

In FIG. 4 the translatory main contact operating members 49 of the circuit interrupters 32 and 33 are shown as being connected by links 62 and 63 to bifurcated distal ends 64 and 65 of a first walking beam, shown generally at 66, and formed of aluminum alloy casting. The first walking beam 66 is mounted for rotation on a shaft 67 which extends upwardly into the mechanism housing 34. At its lower end the shaft 67 is secured by a key 68, FIG. 13, to rotate with a mechanism support 69 which may be a ductile iron casting. The mechanism support 69, FIG. 4, is secured by bolts 70 to a flange 71 which, in turn, is secured by bolts 72 to a metallic fitting 73 that is mounted on and rotates with the upper end of the insulator stack 13. The shaft 67 extends upwardly from the mechanism support 69 through a flange bearing 74, FIG. 13, in a hub 75 that is integral with the mechanism housing 34. The shaft 67 is journaled at its upper end inside the mechanism housing 34 in a manner to be described.

In FIG. 4 the projecting ends of the auxiliary contact operating members 59 from the circuit interrupters 32 and 33 are connected by links 76 and 77 to bifurcated distal ends 78 and 79 of a second walking beam, shown generally at 80, and formed preferably of aluminum alloy casting. The second walking beam 80 is rotatably mounted about the shaft 67 on the first walking beam 66.

While the walking beams 66 and 80 are shown as straight levers pivoted midway their ends, they can be in the form of bell cranks if desired.

It will be observed that the main contact operating members 49 for the circuit interrupters 32 and 33 are located in a common horizontal plane which also includes the first walking beam 66. In like manner the auxiliary contact operating members 59 for the circuit interrupters 32 and 33 are located in a horizontal plane that contains the second walking beam 80, this plane being located above the plane of the first walking beam 66 and parts connected thereto. These planes are slightly above and below the horizontal plane in which the switch blades 28 and 29 of the disconnecting switch 27 are located.

FIGS. 5 and 6 show certain details of construction of the first and second walking beams 66 and 80. The first walking beam 66 is provided with a central hub 81 having flange bearings 82 at its upper and lower ends for rotatable mounting on the shaft 67. The second walking beam 80 has a depending central hub 83 with flange bearings 84 at its upper and lower ends for mounting on a bearing sleeve 85 carried by the central hub 81. The walking beams 66 and 80 are interconnected, in part, by a prestressed tie torsion spring 86 which extends around the central hub 83 and is suitably secured at its ends to the upper side of the walking beam 66 and the under side of the walking beam 80. Since the walking beam 80 is journaled on the central hub 81 of the first walking beam 66, the force exerted by the tie torsion spring 83 is confined to these walking beams and is not transmitted to the shaft 67.

The walking beams 66 and 80 are also arranged to be interconnected by abutment means 89 on the first walking beam 66, the abutment means 89 being in the form of a pair of diametrically opposite sectors as seen in FIG. 6. The abutment means 89 have faces 90 and 91 that look in opposite directions for engagement respectively with faces 92 and 93 on diametrically opposite abutment means 94 carried by the second walking beam 80. FIG. 4 shows more clearly the arrangement of one of the abutment means 89 on the first walking beam 66 with respect to the abutment means 94 on the second walking beam 80. The arrangement is such that, on rotation of the first walking beam 66 in a circuit opening direction, the abutment means 89 engages the faces 92 of the abutment means 94. For the circuit closing direction on reverse rotation of the first walking beam 66, the abutment means 89 thereon are arranged to engage the other faces on the abutment means 94 for closing the auxiliary contacts 53 and 54 of the circuit interrupters 32 and 33. Since the faces 92 on the abutment means 94 are impacted with considerable force, bumper pads 95 are provided on the respective faces 90 of the abutment means 89.

The central hub 81 of the first walking beam 66 is provided with a vertically extending keyway 98, FIG. 6, for receiving a key 99, FIG. 13, for non rotatably securing thereon a hub 100 of a spring retainer 101 of aluminum alloy casting. The spring retainer 101 is arranged to receive the lower ends of nested torsion springs 102 and 103 which together comprise spring means acting to bias the separable contacts to the open position in the circuit interrupters 32 and 33. The lower ends of the torsion springs 102 and 103 are secured to the spring retainer 101 while their upper ends are trapped by a spring adjusting plate 104 which has a toothed periphery 105, FIG. 7, that is arranged to be clamped in a position to hold the springs 102 and 103 under predetermined tension by toothed clamped plates 106. The clamp plates 106 are secured in position by bolts 107 that extend into the mechanism housing 34. The upper end of the shaft 67 is journaled in a flanged bearing 108 that is centrally located on the spring adjusting plate 104. In order to make certain that the shaft 67 is at the same potential as the adjacent parts of the mechanism housing 34, a shunt strap 109 is secured by bolts 110 to the spring adjusting plate 104 and carries a contact 111 for engaging the upper end of the shaft 67. A collar 112 is secured by a set screw to the shaft 67 below the flanged bearing 108. Flexible shunts 114 are connected to the mechanism housing 34 and to the links 76 and 77 in order to provide good connections between the conducting mechanism housing 34 and the auxiliary contact operating members 59 to which the translatory auxiliary contacts 55 are connected. The mechanism housing 34 is provided with a removable cover 115 which is secured in place by bolts 116. This arrangement, together with the location of the springs 102 and 103 on the spring retainer 101 in the upper part of the mechanism housing 34, facilitates assembly of the operating mechanism and the tensioning of the springs 102 and 103.

It will be understood that the first walking beam 66 and thereby the second walking beam 80 is driven by the spring means comprising the torsion springs 102 and 103 first to open the pairs of translatory separable main contacts 45 and 46 in each of the circuit interrupters 32 and 33 followed by opening of the pairs of translatory separable auxiliary contacts 53 and 54 in these circuit interrupters. It is necessary to hold the walking beams 66 and 80 against the biasing action of the torsion spring 102 and 103 until the circuit is to be opened. For this purpose means are provided for latching the walking beams 66 and 80 against rotation. The latching means includes a latch plate 119, FIGS. 5–6, that is secured by screws 120 to a flange 121 that depends from the first walking beam 66. A latch, shown generally at 122 in FIGS. 8, 10 and 14 and referred to in certain of the claims as a first latch, is employed for restraining the first walking beam 66 against rotation. The latch 122 includes a bell crank 123 that is rotatably mounted on a pivot pin 124 which is carried by an arm 125 that extends from a side wall of the mechanism housing 34. One arm 126 of the bell crank 123 carries a latch roller 127 that is arranged to engage the latch plate 119 on the first walking beam 66 in an overcenter toggle locked position. A finger 128 extending endwise from the arm 126 limits rotation of the bell crank 123 in the counterclockwise direction as viewed in FIG. 14. A torsion spring 129 acts to bias the bell crank 123 to the latched position.

The latch 122 is arranged to be unlatched by rotation in a clockwise direction, FIG. 10, through a trigger 130 comprising a bell crank that is rotatably mounted on a pivot pin 131 which is carried by the bell crank 123. One arm 132 of the trigger 130 is urged against an adjusting screw 133 by a torsion spring 134, FIG. 8, while its other arm 135 is arranged to be engaged by one of teeth 136*a–b–c–d* carried by a mechanism cam 137 that is shown more clearly in FIGS. 9 and 13. The mechanism cam 137 has a central hub 138 which is provided with a key way 139 for receiving a key 140 to secure the mechanism cam 137 to the shaft 67 for rotation therewith. By thus placing the mechanism cam 137 close to the end of the shaft 67 where operating torque is applied from the rotatable insulator stack 13 to the mechanism support 69, only a short length of the shaft 67 is subjected to the applied torque. This is of particular importance with respect to the torque required to wind up the springs 102 and 103.

Referring again to FIGS. 8, 10 and 14, the latch 122 also has associated therewith a pryout roller 141 which is carried by an arm 142 of the bell crank 123. The pryout roller 141 is arranged to engage a pryout surface 143, FIGS. 10 and 14, on the first walking beam 66. The purpose of this arrangement is to provide for positively moving the first walking beam 66 in a direction to open the main contacts 45 and 46 of each of the circuit interrupters 32 and 33 in the event that the springs 102 and 103 are unable to initiate this operation. Such forced opening of these contacts might be required in the event that they have remained in the closed position for an extremely long time or became welded in the closed position as the result of current flow. The arrangement is such that the first walking beam 66 can be rotated through an angle of 6° as a result of further rotation of the latch 122 by the mechanism cam 137.

The reason for employing the several teeth 136*a–b–c–d* on the mechanism cam 137 is to provide for engaging the arm 135 of the trigger 130 at various positions of the mechanism cam 137 corresponding to various positions of the rotatable insulator stack 13 where it is desired to initiate an opening operation of the switch construction 10 prior to rotating the insulator stack 13 to the fully closed position. An extension 144 from the bell crank 123 is arranged to engage the flange 145 on the mechanism housing 34 for the purpose of limiting rotation of the latch 122 in a clockwise direction.

The continued rotation of the mechanism cam 137 in a counterclockwise direction as viewed in FIG. 9 after the latch 122 has been tripped is employed for winding up the springs 102 and 103 and generally reclosing the main and auxiliary contacts in the circuit interrupters 32 and 33. For this purpose the mechanism cam 137 has an arm 148 through which a bolt 149 extends. The head 150 of the bolt 149 is arranged to engage an arm 151 of an over-travel pawl 152 that is shown in FIGS. 5, 6, 9, 12 and 13. The over-travel pawl 152 is in the form of a bell crank and is rotatably mounted by pivot pin 153 on the underside of the first walking beam 66. The over-travel pawl 152 includes an arm 154 on which a roller 155 is mounted. The roller 155 is arranged to engage a surface 156 of an over-travel cam 157 that is secured by screws 158 to the hub 75 that is integral with the mechanism housing 34. As long as the roller 155 continues to engage the surface 156 of the over-travel cam 157 as urged by engagement of the head 150 on the bolt 149 carried by the mechanism cam 137 with the arm 151, the first walking beam 66 continues to be rotated and the main and auxiliary contacts in the circuit interrupters 32 and 33 continue to be moved toward their closed position. Since it is desirable that these contacts be moved fully to their closed positions, provision is made to permit the mechanism cam 137 to move to a position slightly beyond the position corresponding to the closed position of these contacts in order to insure that they have been closed. For this purpose the over travel cam 157 has a surface 160 that extends radially with respect to the axis of rotation of the first walking beam 66. When the roller 155 moves from the surface 156 to a position along the surface 160, further rotation of the mechanism cam 137 merely causes the over travel pawl 152 to rotate about the pivot pin 153 and does not effect any further movement of the first walking beam 66. A torsion spring 161, FIG. 5, acts to bias the over travel pawl 152 to the operative position as shown in FIG. 9. It is against the biasing force of this spring 161 that the over travel pawl 152 is rotated to the alternate position shown by broken lines in FIG. 12.

When the first walking beam 66 is rotated in the manner described toward the closed position of the circuit interrupters 32 and 33, the abutment means 89 engage the abutment means 94 on the second walking beam 80 and effect rotation of the latter. The rotation of the first and second walking beams 66 and 80 continues until the main and auxiliary contacts in the circuit interrupters 32 and 33 are fully closed and the latch 122 has engaged the latch plate 119 to prevent reverse rotation of the first walking beam 66 and thereby of the second walking beam 80 under the biasing action of the springs 102 and 103. It is desirable that movement of the second walking beam 80 be prevented momentarily after the latch 122 is tripped and the first walking beam 66 rotates to open the main contacts of the circuit interrupters 32 and 33. For this purpose there is provided a latch plate 164, FIGS. 5–6, on the second walking beam 80. The latch plate 164 is secured by screws 165 to an upstanding flange 166 on the second walking beam 80. The latch plate 164 is arranged to be engaged by a latch, shown generally at 167, in FIGS. 11 and 14 and is referred to in certain of the claims as a second latch. The latch 167 includes a latch arm 168 that is rotatably mounted by a pivot pin 169 on an arm 170 that extends inwardly from a side wall of the mechanism housing 34. The latch arm 168 carries a latch roller 171 that is arranged to have over center toggle locked engagement with the latch plate 164 in fully latched position. A torsion spring 172 acts to bias the latch arm 178 in a counterclockwise direction and into latching engagement with the latch plate 164. In order to release the latch 167, the latch arm 168 is provided with an integral flange 173 having an inclined cam surface 174 which is arranged to be engaged by a roller 175. The roller 175 is carried by a roller support bracket 176 that is secured by bolts 177 to an upstanding flange 178 on the spring retainer 101. It will be recalled that the spring retainer 101 is keyed to the central hub 81 of the first walking beam 66. Accordingly, the roller 175 is moved together with the first walking beam 66 and the tie torsion spring 86 is further stressed. At a predetermined point in the movement of the first walking beam 66 toward the circuit opening position, the roller 175 is caused to engage the cam surface 174. As a result the latch 167 is tripped by rotation of the latch arm 168 in a clockwise direction to move the roller 171 out of latching engagement with the latch plate 164. Then the second walking beam 80 is freed to rotate first under the influence of the tie spring 86 followed by engagement of the abutment means 94 on the second walking beam 80 by the abutment means 89 on the first walking beam 66. Some of the kinetic energy incident to the rotation of the first walking beam 66 is transmitted by this impact to the second walking beam 80. Momentarily the springs 102 and 103 drive through the first walking beam 66 to the second walking beam 80 to open the auxiliary contacts in the circuit interrupters 32 and 33. The walking beam 80 accelerates to catch up to walking beam 66 so that they reach full open position at about the same instant. An extension 179 from the latch arm 168 acts as a stop for rotation in a clockwise direction on engagement with a flange 180 extending inwardly from a side wall of the mechanism housing 34.

At the ends of the opening movements of the main and auxiliary contacts in the circuit interrupters 32 and 33 it is desirable that further movement thereof in the opening directions be stopped with a minimum of shock. For this purpose, as shown in FIGS. 5 and 14, the bifurcated distal ends 64 and 65 of the first walking beam 66 are provided with impact surfaces 184 and 185 that are arranged to engage resilient bumper assemblies shown generally at 186 and 187, FIG. 14. Likewise, the distal ends 78 and 79 of the second walking beam 80 are provided with impact surfaces 188 and 189 for engaging these same bumper assemblies 186 and 187.

It will be understood that the separable main and auxiliary contacts in the circuit interrupters 32 and 33 and the positions of the first and second walking beams 66 and 80 in the mechanism housing 34 are not readily visible. However, it is desirable that some means be provided for indicating externally and positively whether these contacts are in the open or the closed position. This can be accomplished by displaying externally an indication of the position of the first walking beam 66. For this purpose, as shown in FIGS. 13, 14 and 15, a finger 194 is mounted by screws 195 on a fitting 196 into which the threaded end of the main contact operating member 49 of the circuit interrupter 32 is screwed. Pins 197 extend from this fitting 196 and through the associated links 62. The finger 194 extends downwardly to engage an arm 198 that forms a part of a bell crank 199 which is rotatably mounted on a pivot pin 200 that is carried by bottom cover 34' mounted on the mechanism housing 34. A torsion spring 201 acts to bias the bell crank 199 in order to maintain the arm 198 in engagement with the distal end of the finger 194. The bell crank 199 also includes an arm 202 which has a depending bifurcated end 203 between the furcations of which a pin 204 extends. The pin 204 is carried by an indicator drum 205 at a position offset from its axis of rotation on pivots 206 suitably journaled on the bottom cover 34'. The indicator drum 205 carries suitable indicia, such as colored reflecting tape or the like, which can be viewed through a window 207 on the underside of the bottom cover 34', the color that appears in the window 207 corresponding to the position of the first walking beam 66 and thereby the positions of the separable contacts in the circuit interrupters 32 and 33.

In describing the operation of the switch construction 10 it will be assumed that it is in the closed position indicated in FIGS. 1 and 2 of the drawings and that the separable main and auxiliary contacts in the circuit interrupters 32 and 33 are in the closed positions as shown in FIGS. 3A–B. In this closed poistion the pair of translatory spearable main contacts 45 in each of the circuit interrupters 32 and 33 are connected in series circuit relation through the mechanism housing 34. Likewise, the pairs of translatory separable auxiliary contacts 53 in the circuit interrupters 32 and 33 are connected in series circuit interrupters 32 and 33 are connected in series circuit relation through the mechanism housing 34 and also they are connected in parallel circuit relation with the respective pairs of main contacts 45. Depending upon whether or not they are provided, additional pairs of main and auxiliary contacts are connected in series and parallel relation in the same respect. The various parts of the operating mechanism within the mechanism housing 34 occupy the positions shown by full lines in FIGS. 5–15, it being understood that the roller 171 on the latch arm 168 of the latch 167 is spaced slightly from the latch plate 164.

In opening the switch construction 10 the arrangement is such that the circuit is interrupted by the circuit interrupters 32 before the contacts 30 and 31 at the distal ends of the switch blades 28 and 29 are separated. Suitable means are provided for rotating the shaft 16, FIGS. 1 and 2, to rotate insulator stacks 14 and 15 and initiate rotation of the switch blades 28 and 29 to their full open positions as shown by broken lines. Through the link 24 the insulator stack 13 is rotated to rotate the shaft 67 and therewith the mechanism cam 137. The first tooth 136*a*, FIG. 10, on the mechanism cam 137 engages the arm 135 of the trigger 130 and bodily rotates the latch 122 to move the latch roller 127 to the position as shown by broken lines and out of engagement with the latch plate 119. In the event that the first walking beam 66 does not immediately rotate under the influence of the springs 102 and 103, the continued rotation of the mechanism cam 137 swings the pryout roller 141 into engagement with the pryout surface 143 on the first walking beam 66 and it is forced to begin rotation in a clockwise direction. The force acting to rotate the first walking beam 66 from the springs 102 and 103 is transmitted directly thereto the spring retainer 101 which is keyed by the key 99 to the hub 81 of the first walking beam 66. Conjointly with rotation of the first walking beam 66, the main contact operating members 49 are pulled into the mechanism housing 34 and the main contacts 47 are caused to separate from the stationary contacts 48 of the pairs of main contacts 45 and 46 in each of the circuit interrupters 32 and 33. The current flow then is transferred entirely to the pairs of auxiliary contacts 53 and 54 in each of the circuit interrupters 32 and 33.

Shortly after the first walking beam 66 starts to rotate in a circuit opening direction, the faces 91 on the abutment means 89 that had been in engagement with the faces 93 on the abutment means 94 of the second walking beam 80 move out of engagement therewith and permit the second walking beam 80 to rotate slightly until the latch plate 164 thereon is engaged by the latch roller 171 of the latch 167, FIG. 11. The second walking beam 80 then is held momentarily against further rotation.

As rotation of the first walking beam 66 continues, the bumper pads 95 on the faces 90 of the abutment means 89 engage the faces 92 onthe abutment means 94. Concurrently therewith the roller 175, FIG. 11, engages the inclined cam surface 174 on the latch 167 to move the latch roller 171 out of latching engagement with the latch plate 164. The impact delivered by the first walking beam 66 to the second walking beam 80 together with the biasing action of the tie spring 86 acts to accelerate the second walking beam 80. Since the second walking beam 80 is engaged simultaneously at diametrically opposite positions, its distal ends 78 and 79 are subjected to substantially equal and simultaneous acceleration forces which forces are employed for effecting translatory movement of the auxiliary contact operating members 59 and thereby of the pairs of auxiliary contacts 53 and 54 in each of the circuit interrupters 32 and 33 together with their respective pump means 57 and 58. As shown in FIG. 11 the latch 167 is rotated to the position shown by broken lines for unlatching the second walking beam 80.

Once the latch 122 has been tripped and the first walking beam 66 starts to rotate, the circuit is interrupted by the circuit interrupters 32 and 33 independently of the speed of rotation of the insulator stack 13. At the end of its travel the distal ends 64 and 65 engage the bumper assemblies 186 and 187. Likewise, at the end of the movement of the second walking beam 80, its distal ends 78 and 79 also engage the bumper assemblies 186 and 187. After the circuit has been opened by the circuit interrupters 32 and 33, the contacts 30 and 31 at the ditsal ends of the switch blades 28 and 29 are separated and the switch blades 28 and 29 are swung to the position shown by broken lines in FIG. 2. Here an air gap is provided in series with the circuit interrupters 32 and 33.

As the insulator stack 13 continues to be rotated on the continued rotation of the switch blades 28 and 29 toward their full open positions, the mechanism cam 137 is rotated to carry with it the bolt 149 to the position shown by broken lines in FIG. 12. During the opening operation of the circuit interrupters 32 and 33 the first walking beam 66 comes to rest in the position shown in FIG. 12 by full lines against the bumper assemblies 186 and 187. As shown by the broken line position of the bolt 149, the head 150 thereof engages the arm 151 of the over travel pawl 152 and the continued rotation of the mechanism cam 137 starts the rotation of the first walking beam 66 toward the position shown by broken lines in FIG. 12. Since the roller 155 on the over travel pawl 152 engages the surface 156 on the over travel cam 157, no rotation of the over travel pawl 152 takes place relative to the first walking beam 66 and the latter is rotated conjointly with the rotation of the mechanism cam 137 sequentially to move the main contacts 45 and 46 and the auxiliary contacts 53 and 54 back to the circuit closed position where they are held by the latch 122, FIG. 10, reacting against the latch plate 119 on the first walking beam 66. During this operation the springs 102 and 103 are wound up. As described, the continued rotation of the mechanism cam 148 causes the roller 155 to move from the surface 156 to the surface 160 on the over travel cam 157. This permits the mechanism cam 137 to rotate slightly past the position where the latch 122 holds the first walking beam 66 and the main contacts 45 and 46 in each of the circuit interrupters 32 and 33 in the closed position. The rotation of the first walking beam 66 in a closing direction moves the faces 91 on the abutment means 89 into engagement with the faces 93 on the abutment means 94 of the second walking beam 80. Accordingly, it is rotated together with movement of the auxiliary contacts 53 and 54 in each of the circuit interrupters 32 and 33 to the closed position.

At the end of the opening movement of the shaft 16, FIGS. 1 and 2, the disconnecting switch 27 is in the open position and the circuit interrupters 32 and 33 have been reclosed. The switch construction 10 then is in readiness for reclosure of the disconnecting switch 27 to be followed by the next circuit opening operation.

As the first walking beam 66 is rotated from one position to the other, the indicator drum 205 is rotated from one position to another in order to indicate the corresponding positions of the contacts in the circuit interrupters 32 and 33.

What is claimed as new is:

1. In a high voltage circuit interrupter:

two pairs of translatory separable contacts connected in series circuit relation, a translatory operating member for each pair of separable contacts, a walking beam rotatably mounted between its distal ends, link means interconnecting said operating members and said distal ends of said walking beam, spring means biasing said walking beam to rotate it to open said pairs of separable contacts substantially simultaneously, and latch means cooperating with said walking beam to prevent rotation thereof by said spring means to open said pairs of separable contacts.

2. The high voltage circuit interrupter of claim 1, wherein pryout means on the latch means cooperate with the walking beam to initiate rotation thereof if the spring means is unable to do so.

3. The high voltage circuit interrupter of claim 1, wherein:

a mechanism cam rotatable about the axis of rotation of the walking beam cooperates with the latch means to unlatch it to permit the spring means to rotate said walking beam and open the pairs of separable contacts, and abutment means on said mechanism cam operatively engages said walking beam to rotate it in a direction to wind up said spring means, close said pairs of separable contacts and to rotate said walking beam to a position to be held against reverse movement by said latch means.

4. The high voltage circuit interrupter of claim 3, wherein the mechanism cam is operatively engageable with the latch at a plurality of angular positions whereby said latch can be tripped at different operating positions of said mechanism cam.

5. The high voltage circuit interrupter of claim 3, wherein:

an over travel pawl is rotatably mounted on the walking beam and has one arm for engagement by the abutment means and another arm acting as a cam follower, and an over travel cam cooperates with said cam follower to prevent rotation of said over travel pawl relative to said walking beam during a portion of its rotation by said abutment means on the mechanism cam until said walking beam is rotated to a predetermined position whereupon said over travel pawl is permitted by said over travel cam to rotate relative to said walking beam and continued rotation of said mechanism cam is ineffective to rotate said walking beam.

6. In a high voltage circuit interrupter:

two pairs of translatory separable main contacts connected in series circuit relation, two pairs of translatory separable auxiliary contacts connected in series circuit relation and in parallel circuit relation respectively with said pairs of main contacts, a translatory operating member for each pair of separable contacts, first and second walking beams rotatably mounted about a common axis between their distal ends, link means interconnecting the operating members for each pair of separable main contacts and the distal ends of said first walking beam, link means interconnecting the operating members for each pair of separable auxiliary contacts and the distal ends of said second walking beam, means operatively interconnecting said walking beams, and means for rotating said first walking beam to open said pairs of separable main contacts and thereafter rotating said second walking beam to open said pairs of separable auxiliary contacts substantially simultaneously.

7. The high voltage circuit interrupter of claim 6, wherein the pairs of separable main contacts, operating members therefor, and the first walking beam are located in a plane and the pairs of separable auxiliary contacts, operating members therefor, and the second walking beam are located in a plane parallel to the first mentioned plane.

8. The high voltage circuit interrupter of claim 6, wherein the means operatively interconnecting the first and second walking beam includes:

a tie spring acting to bias said second walking beam for rotation relative to said first walking beam, and abutment means on said first walking beam for engaging abutment means on said second walking beam.

9. The high voltage circuit interrupter of claim 8, wherein:

the means for rotating the first walking beam and thereafter the second walking beam includes spring means to bias said first walking beam to open the pairs of separable main contacts followed by opening of the pairs of auxiliary contacts, a first latch cooperates with said first walking beam to prevent movement thereof to open said pairs of separable main contacts, a second latch cooperates with said second walking beam to prevent movement thereof to open said pairs of separable auxiliary contacts, and means carried by said first walking beam cooperates with said second latch to unlatch it to permit the tie spring and said spring means to rotate said second walking beam and open the pairs of separable auxiliary contacts.

10. The high voltage circuit interrupter of claim 9, wherein:

a mechanism cam rotatable about the axis of rotation of the walking beams cooperates with the first latch to unlatch it to permit the spring means to rotate the first walking beam, and abutment means on said mechanism cam operatively engages said first walking beam to rotate it and thereby the second walking beam in a direction to wind up the tie spring and said spring means, close the pairs of separable main and auxiliary contacts and to rotate said walking beams to positions where they are held against reverse rotation by said first latch.

11. In a high voltage circuit interrupter:

two pairs of translatory separable main contacts connected in series circuit relation, two pairs of translatory separable auxiliary contacts connected in series circuit relation and in parallel circuit relation respectively with said pairs of main contacts, a translatory operating member for each pair of separable main and auxiliary contacts, a rotatable shaft, first and second walking beams rotatably mounted on said shaft midway their distal ends, link means interconnecting the operating members for each pair of separable main contacts and the distal ends of said first walking beam, link means interconnecting the operating members for each pair of separable auxiliary contacts and the distal ends of said second walking beam, means operatively interconnecting said walking beams, spring means biasing said first walking beam for rotation to open said pairs of separable main contacts followed by rotation of said second walking beam to open said pairs of separable auxiliary contacts, a latch cooperating with said first walking beam to prevent rotation thereof by said spring means, a mechanism cam rotatable with said shaft to unlatch said latch on rotation of said shaft to a predetermined position to permit said first walking beam to rotate and open said pairs of separable contacts.

12. The high voltage circuit interrupter of claim 11, wherein:

bearings rotatably support the shaft at its ends, drive means is connected to one end of said shaft for rotating it, the means operatively interconnecting the walking beams includes:

a tie spring acting to bias the second walking beam for rotation relative to said first walking beam, and abutment means on said first walking beam for engaging abutment means on said second walking beam, bearing means rotatably mounting said second walking beam on said first walking beam whereby the force exerted by said tie spring is confined substantially entirely to said bearing means.

13. The high voltage circuit interrupter of claim 12, wherein the abutment means on the first and second walking beams are symmetrically located in pairs thereon to transmit substantially equal and simultaneous acceleration forces to the distal ends of the second walking beam substantially without reaction against the bearing means between said walking beams.

14. The high voltage circuit interrupter of claim 11, wherein:

bearings rotatably support the shaft at its ends, drive means is connected to one end of said shaft for rotating it, the spring means includes a torsion spring coiled around said shaft, means anchor one end of said torsion spring adjacent the other end of said shaft and the other end of said torsion spring to the first walking beam, abutment means on the mechanism cam operatively engages said first walking beam to rotate it and thereby the second walking beam in a direction to wind up said torsion spring, close the pairs of separable main and auxiliary contacts and to rotate said walking beams to positions where they are held against reverse rotation by the latch, and means secure said mechanism cam to said shaft adjacent said one end thereof whereby the torque for rotating said walking beams, closing said pairs of contacts and winding up said torsion spring is transmitted through a relatively short portion of said shaft.

15. The high voltage circuit interrupter of claim 14, wherein:

the means for anchoring one end of the torsion spring includes an adjustable anchor plate carrying the bearing for the other end of the shaft, and clamp means cooperate with said anchoring means for holding it in a position where a predetermined tension is applied to said torsion spring.

16. The high voltage circuit interrupter of claim 11, wherein:

an insulating housing individual to each pair of parallel connected main and auxiliary contacts supports the same, a conducting mechanism housing mechanically supports one end of each insulating housing and electrically connects the pairs of separable main and auxiliary contacts in series circuit relation, and bearings carried by said mechanism housing rotatably support therein the shaft and the first and second walking beams mounted thereon.

17. The high voltage circuit interrupter of claim 16, wherein:

the insulating housings are sealed from the atmosphere and from the mechanism housing, an arc extinguishing gas fills each housing, the translatory operating member for each pair of separable main and auxiliary contacts extends from the respective sealed housing into said mechanism housing, and pump means in each insulating housing operated by the operating member for the respective separable auxiliary contacts for causing a flow of said arc extinguishing gas into the space between said auxiliary contacts on separation thereof.

18. The high voltage circuit interrupter of claim 11, wherein:

disconnecting switch means are connected in series circuit relation with the pairs of series and parallel connected separable main and auxiliary contacts, and means are provided for rotating the shaft to open said separable main and auxiliary contacts and subsequently to open said disconnecting switch means.

19. High voltage switch means comprising switch blade means movable between switch closed and switch open positions, a pair of circuit interrupters connected in series circuit relation and in series circuit relation with said switch blade means, said circuit interrupters being positioned in end to end relation with said switch blade means, said circuit interrupters being positioned in end to end relation and on opposite sides of the plane of said switch blade means in switch closed position, operating means for said circuit interrupters at their juxtaposed ends, and means operatively interconnecting said switch blade means and said operating means for opening and closing said switch blade means and said circuit interrupters in predetermined sequence.

20. The high voltage switch means of claim 19, wherein the switch blade means includes a pair of center break switch blades rotatable in a plane at right angles to the plane on opposite sides of which the circuit interrupters are positioned.

21. The high voltage switch construction of claim 20, wherein the circuit interrupters are positioned in the plane in which the switch blades are movable.

22. The high voltage switch means of claim 19, wherein:

a conducting mechanism housing supports the circuit interrupters at their juxtaposed ends, provides the series connection therebetween, and encloses the operating means therefor, and each circuit interrupter includes an insulating housing sealed from the atmosphere and from said mechanism housing and filled with an arc extinguishing gas.

References Cited

UNITED STATES PATENTS 2,981,814 4/1961 Friedrich ----------- 200—148

FOREIGN PATENTS 34,091 4/1951 Poland.

ROBERT K. SCHAEFER, *Primary Examiner.*

H. J. HOHAUSER, *Assistant Examiner.*